(12) United States Patent
Bakopoulos et al.

(10) Patent No.: US 12,278,662 B2
(45) Date of Patent: Apr. 15, 2025

(54) SYSTEMS AND METHODS FOR IDENTIFYING FIBER LINK FAILURES IN AN OPTICAL NETWORK

(71) Applicant: Mellanox Technologies, Ltd., Yokneam (IL)

(72) Inventors: Paraskevas Bakopoulos, Attiki (GR); Konstantinos Tokas, Athens (GR); Ioannis (Giannis) Patronas, Piraeus (GR); Nikolaos Argyris, Zografou (GR); Dimitrios Syrivelis, Volos (GR); Dimitrios Kalavrouziotis, Papagos (GR); Elad Mentovich, Tel Aviv (IL); Eitan Zahavi, Zichron Yaakov (IL); Louis Bennie Capps, Jr., Georgetown, TX (US); Prethvi Ramesh Kashinkunti, Chicago, IL (US); Julie Irene Marcelle Bernauer, Palo Alto, CA (US)

(73) Assignee: Mellanox Technologies, Ltd., Yokneam (IL)

( * ) Notice: Subject to any disclaimer, the term of this patent is extended or adjusted under 35 U.S.C. 154(b) by 187 days.

(21) Appl. No.: 17/896,877

(22) Filed: Aug. 26, 2022

(65) Prior Publication Data
US 2024/0039627 A1    Feb. 1, 2024

(30) Foreign Application Priority Data
Jul. 26, 2022    (GR) ................................ 0220100605

(51) Int. Cl.
*H04B 10/071* (2013.01)
*H04B 10/073* (2013.01)
(Continued)

(52) U.S. Cl.
CPC ......... *H04B 10/073* (2013.01); *H04B 10/071* (2013.01); *H04B 10/0771* (2013.01); *H04B 10/0773* (2013.01); *H04B 10/0791* (2013.01)

(58) Field of Classification Search
CPC .................................................. H04B 10/071
See application file for complete search history.

(56) References Cited

U.S. PATENT DOCUMENTS 10,270,527 B1    4/2019    Mentovich et al.
10,361,777 B2    7/2019    Mentovich et al.
(Continued)

OTHER PUBLICATIONS

Pending German Patent Application No. 102017129039.7, filed Dec. 6, 2017.

(Continued)

*Primary Examiner* — Nathan M Cors
(74) *Attorney, Agent, or Firm* — R. W. McCord Rayburn; Moore & Van Allen PLLC

(57) ABSTRACT

Systems, computer program products, and methods are described herein for network discovery, port identification, and/or identifying fiber link failures in an optical network, in accordance with an embodiment of the invention. The present invention may be configured to sequentially connect each port of an optical switch to a network port of a server and generate, based on information associated with network devices connected to the ports, a network map. The network map may identify which network devices are connected to which ports of the optical switch and may permit dynamic port mapping for network installation, upgrades, repairs, and/or the like. The present invention may also be configured to determine a fiber link in which a failure occurred and reconfigure the optical switch to allow communication between an optical time-domain reflectometer and the fiber link to test the fiber link.

22 Claims, 5 Drawing Sheets

(51) Int. Cl.
*H04B 10/077* (2013.01)
*H04B 10/079* (2013.01)

(56) References Cited

U.S. PATENT DOCUMENTS

| | | | |
|---|---|---|---|
| 10,394,060 | B2 | 8/2019 | Mentovich et al. |
| 10,467,763 | B1 | 11/2019 | Sun et al. |
| 10,776,688 | B2 | 9/2020 | Huaizu et al. |
| 10,964,034 | B1 | 3/2021 | Cook |
| 11,140,780 | B2 | 10/2021 | Ganor et al. |
| 11,176,682 | B2 | 11/2021 | Zhang et al. |
| 11,184,085 | B1 | 11/2021 | Mentovich et al. |
| 11,350,189 | B2 | 5/2022 | Bakopoulos et al. |
| 11,368,768 | B2 | 6/2022 | Bakopoulos et al. |
| 11,430,134 | B2 | 8/2022 | Zhang et al. |
| 11,496,218 | B1 | 11/2022 | Mentovich et al. |
| 2006/0007426 | A1* | 1/2006 | Weller ............... H04B 10/071 356/73.1 |
| 2009/0190921 | A1* | 7/2009 | Nakajima .......... G01M 11/3136 398/21 |
| 2010/0316372 | A1* | 12/2010 | Chang ............... H04B 10/0771 398/12 |
| 2017/0180041 | A1* | 6/2017 | Yi ..................... H04B 10/0791 |
| 2022/0014828 | A1 | 1/2022 | Bakopoulos et al. |
| 2022/0109498 | A1* | 4/2022 | Vaez-Ghaemi ...... H04B 10/071 |
| 2022/0283973 | A1 | 9/2022 | Levi et al. |

OTHER PUBLICATIONS

Pending German Patent Application No. 102018108324.6, filed Apr. 9, 2018.

Related U.S. Appl. No. 17/869,997, filed Jul. 21, 2022, entitled "Transceiver Module".

Related U.S. Appl. No. 18/083,981, filed Dec. 19, 2022, entitled "Systems and Methods for Resilient Switch Devices".

Related U.S. Appl. No. 17/982,827, filed Nov. 8, 2022, entitled "Systems and Methods for Providing Resilience in Network Communications".

Related U.S. Appl. No. 17/982,895, filed Nov. 8, 2022, entitled "Systems and Methods for Improved Network Resilience".

Related U.S. Appl. No. 17/948,930, filed Sep. 20, 2022, entitled "Systems and Methods for Fast Link Bringup".

Related U.S. Appl. No. 17/869,932, filed Jul. 21, 2022, entitled "Synchronization of Optically Switched Networks".

Related U.S. Appl. No. 17/948,717, filed Sep. 20, 2022, entitled "Apparatuses and Methods for Reducing Data Port Delay".

Related U.S. Appl. No. 17/956,035, filed Sep. 29, 2022, entitled "System for Machine Learning (ML) Based Network Resilience and Steering".

Related U.S. Appl. No. 17/956,208, filed Sep. 29, 2022, entitled "Machine Learning (ML) Based Systems for Air Gapping Network Ports".

Related U.S. Appl. No. 17/984,424, filed Nov. 10, 2022, entitled "Scalable Networking Systems and Patch Panels".

Related U.S. Appl. No. 17/964,367, filed Oct. 12, 2022, entitled "Systems and Methods for Dynamic Reconfiguration of Network Communications".

Related U.S. Appl. No. 18/093,478, filed Jan. 5, 2023, entitled "Switch Port Aggregation in Centralized Software-Defined Networks (Sdn)".

* cited by examiner

SYSTEMS AND METHODS FOR IDENTIFYING FIBER LINK FAILURES IN AN OPTICAL NETWORK

CROSS-REFERENCE TO RELATED APPLICATION

The present application claims the benefit of Greek Patent Application No. 20220100605 for "Systems and Methods for Identifying Fiber Link Failures in an Optical Network" filed Jul. 26, 2022, which is hereby incorporated by reference in its entirety.

FIELD OF THE INVENTION

The present invention relates to systems and methods for network discovery, port identification, and/or identifying fiber link failures in an optical network.

BACKGROUND

An optical network, such as an optical datacenter network, may include a plurality of fiber links connecting a plurality of network devices, such as switches, servers, systems, computing devices, and/or the like, for providing computational, storage, and/or network resources. The network devices typically include transceivers for sending and/or receiving the optical signals through the fiber links and/or, in the case of switches, components for receiving and routing the optical signals through the fiber links between the network devices.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. This summary presents some concepts of one or more embodiments of the present invention in a simplified form as a prelude to the more detailed description that is presented later.

In one aspect, the present invention is directed to a system for network discover and port identification in an optical network. The system may include an optical switch in communication with one or more network devices via an optical network, where the optical switch includes a plurality of ports. The system may include a server that includes a network port, at least one processing device, and at least one non-transitory storage device. The system may include a controller in communication with the optical switch, where the controller is configured to sequentially connect each port of the plurality of ports to the network port of the server. The at least one non-transitory storage device of the server may include computer-executable program code that, when executed by the at least one processing device, causes the at least one processing device to generate a network map based on information associated with the one or more network devices connected to the plurality of ports.

In some embodiments, the network map may identify, for each port of the plurality of ports of the optical switch, a network device, of the one or more network devices, that is in communication with the port.

In some embodiments, generating the network map for the optical network may include receiving information identifying each network device of the one or more network devices and generating the network map based on the information.

In some embodiments, the at least one non-transitory storage device of the server may include computer-executable program code that, when executed by the at least one processing device, causes the at least one processing device to, after an upgrade is performed on the optical network, regenerate the network map for the optical network.

In another aspect, the present invention is directed to a system for identifying one or more fiber link failures in an optical network. The system may include an optical switch in communication with one or more network devices via an optical network, where the optical network includes a plurality of fiber links and an optical time-domain reflectometer. The system may include a controller in communication with the optical switch and the optical time-domain reflectometer, where the controller is configured to receive an indication of a failure in the optical network, determine, in response to receipt of the indication and based on a network map, a fiber link of the plurality of fiber links in which the failure occurred, and reconfigure, in response to the receipt of the indication, the optical switch to allow communication between the optical time-domain reflectometer and the determined fiber link to thereby test the determined fiber link.

In some embodiments, the controller may be configured to test, using the optical time-domain reflectometer, the determined fiber link, generate, based on testing the determined fiber link, a report, and provide, to a network management system, the report. Additionally, or alternatively, the report may include. a type of the failure in the determined fiber link and a distance of the failure from the optical switch. In some embodiments, the type of the failure in the determined fiber link may include at least one of: a fiber failure, a contaminated connector, a connector pair failure, an end of link failure, or a fiber bend.

In some embodiments, the determined fiber link may include a plurality of fiber link elements, and reconfiguring the optical switch to allow communication between the optical time-domain reflectometer and the determined fiber link for testing the determined fiber link, may include, sequentially for each fiber link element of the plurality of fiber link elements of the determined fiber link, reconfiguring the optical switch to allow communication between the optical time-domain reflectometer and a respective fiber link element of the determined fiber link and testing, using the optical time-domain reflectometer, the respective fiber link element of the determined fiber link. Additionally, or alternatively, the plurality of fiber link elements may include one or more fibers and one or more connectors.

In some embodiments, the optical switch may be a first optical switch, the system may include a second optical switch paired with the optical time-domain reflectometer, and the controller may be configured to configure the second optical switch to allow communication between the optical time-domain reflectometer and (1) an input port of the determined fiber link and (2) an output port of the determined fiber link.

In some embodiments, the optical time-domain reflectometer may be a first optical time-domain reflectometer, the system may include a second optical time-domain reflectometer, and the controller may be configured to, when reconfiguring the optical switch to allow communication between the first optical time-domain reflectometer and the determined fiber link, configure the optical switch to (i) allow communication between the first optical time-domain reflectometer and an input port of the determined fiber link and (ii) allow communication between the second optical time-domain reflectometer and an output port of the determined fiber link and test the determined fiber link using the first optical time-domain reflectometer and the second optical time-domain reflectometer.

In yet another aspect, the present invention is directed to a method for identifying one or more fiber link failures in an optical network. The method may include receiving, via a controller, an indication of a failure in an optical network, where the optical network includes a plurality of fiber links, and where the controller is in communication with an optical switch and an optical time-domain reflectometer. The method may include determining, in response to receipt of the indication and based on a network map, a fiber link of the plurality of fiber links in which the failure occurred and reconfiguring, in response to receipt of the indication and via the controller, the optical switch to allow communication between the optical time-domain reflectometer and the determined fiber link to thereby test the determined fiber link.

In some embodiments, the method may include testing, with the optical time-domain reflectometer, the determined fiber link, generating, based on testing the determined fiber link, a report, and providing the report to a network management system.

In some embodiments, the determined fiber link may include a plurality of fiber link elements, and reconfiguring the optical switch to allow communication between the optical time-domain reflectometer and the determined fiber link may include, sequentially and for each element of the determined fiber link, reconfiguring the optical switch to allow communication between the optical time-domain reflectometer and a respective fiber link element of the determined fiber link and testing, with the optical time-domain reflectometer, the respective fiber link element of the determined fiber link. Additionally, or alternatively, the plurality of fiber link elements may include one or more fibers and one or more connectors.

In some embodiments, the method may include determining, with the optical time-domain reflectometer, a type of the failure in the determined fiber link and a distance of the failure from the optical switch.

In some embodiments, the method may include generating, via a server, the network map for the optical network, where the server includes a network port in communication with the optical switch. Additionally, or alternatively, the optical switch may include a plurality of ports and generating the network map for the optical network may include sequentially connecting each port of the plurality of ports to the network port of the server and generating the network map based on information associated with one or more network devices connected to the plurality of the ports. In some embodiments, generating the network map for the optical network may include receiving, from a network management system, information identifying each network device connected to the optical switch and generating, via the server, the network map and a port map based on the information. Additionally, or alternatively, the method may include regenerating, after an upgrade is performed on the optical network, the network map for the optical network.

In yet another aspect, the present invention is directed to a computer program product for identifying one or more fiber link failures in an optical network. The computer program product may include a non-transitory computer-readable medium comprising code that, when executed by a first apparatus, causes the first apparatus to receive an indication of a failure in an optical network, where the optical network includes a plurality of fiber links and an optical switch in communication with one or more network devices and an optical time-domain reflectometer. The computer program product may include a non-transitory computer-readable medium comprising code that, when executed by a first apparatus, causes the first apparatus to determine, in response to receiving the indication and based on a network map, a fiber link of the plurality of fiber links in which the failure occurred and reconfigure, in response to receiving the indication, the optical switch to allow communication between the optical time-domain reflectometer and the determined fiber link.

The features, functions, and advantages that have been discussed may be achieved independently in various embodiments of the present invention or may be combined with yet other embodiments, further details of which may be seen with reference to the following description and drawings.

BRIEF DESCRIPTION OF THE DRAWINGS

Figure 1:
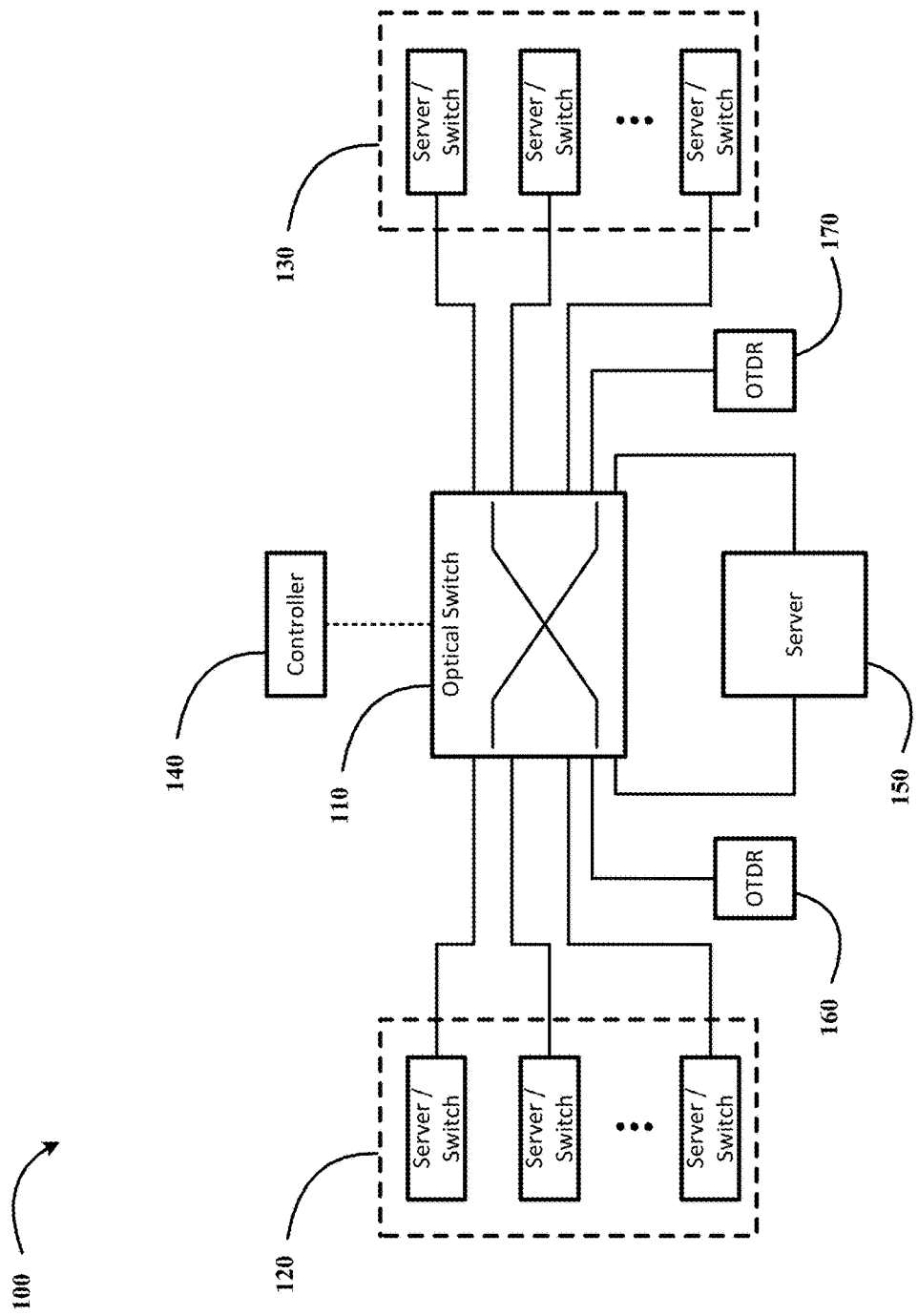
Figure 2:
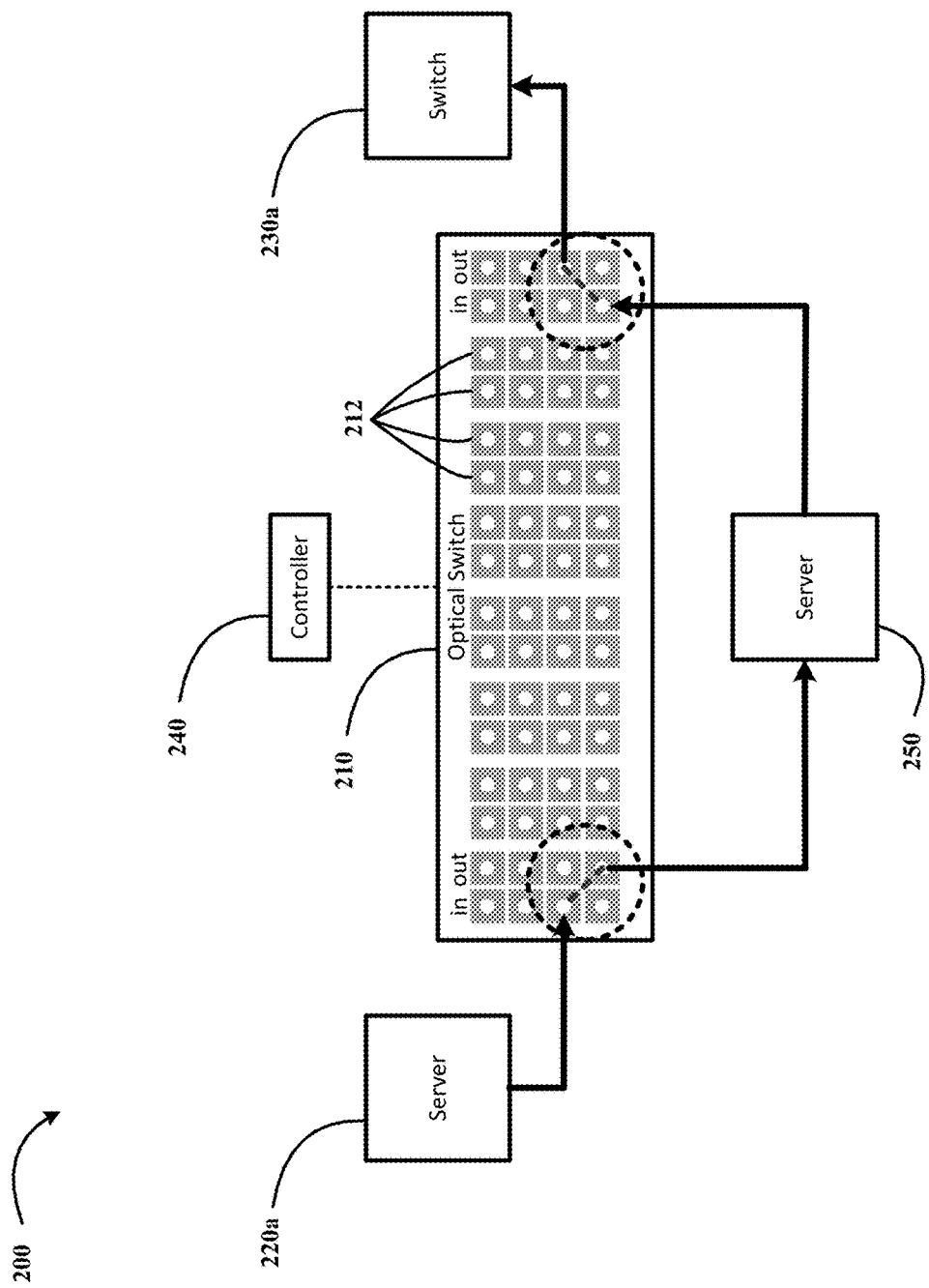
Figure 3:
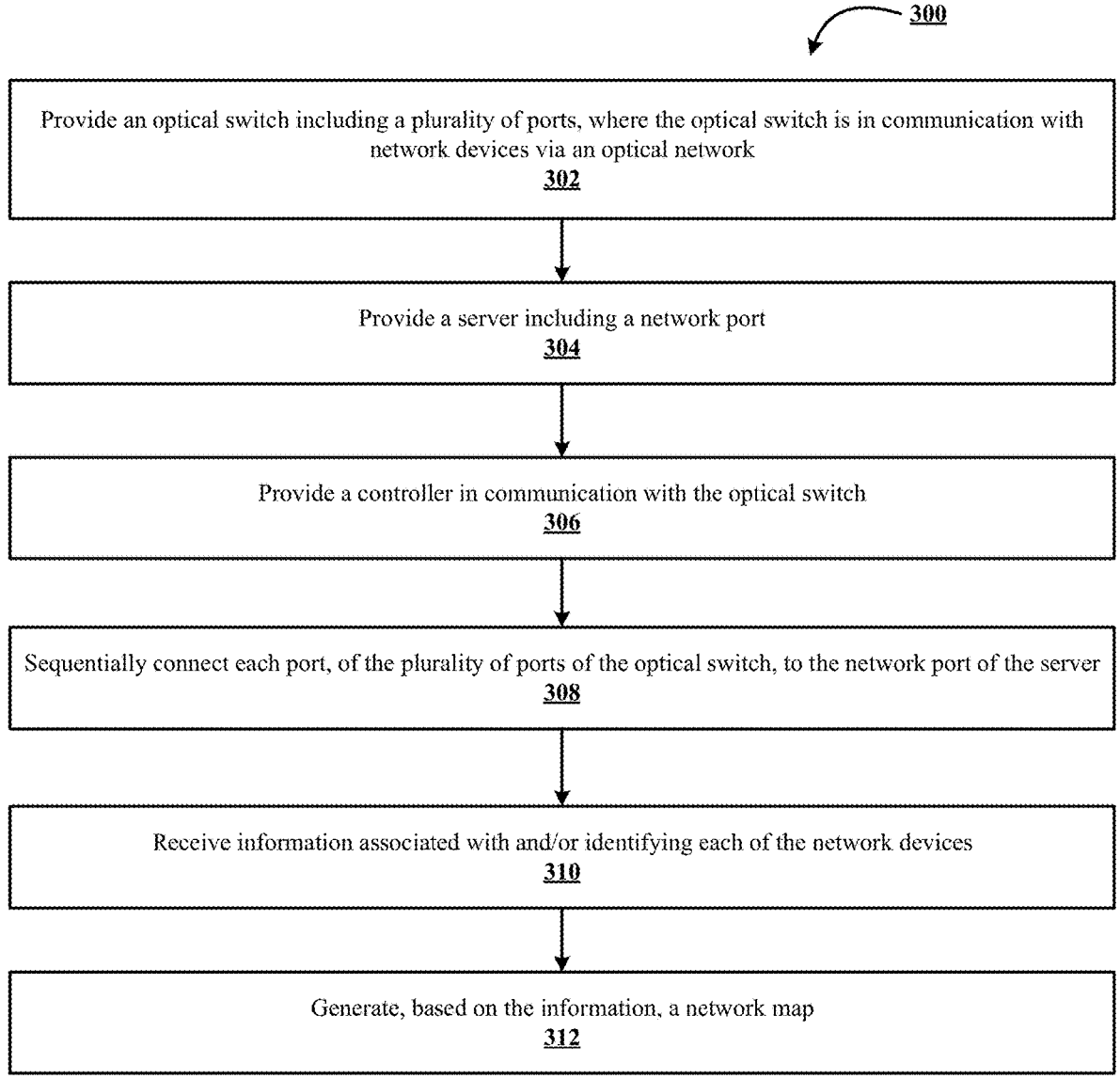
Figure 4:
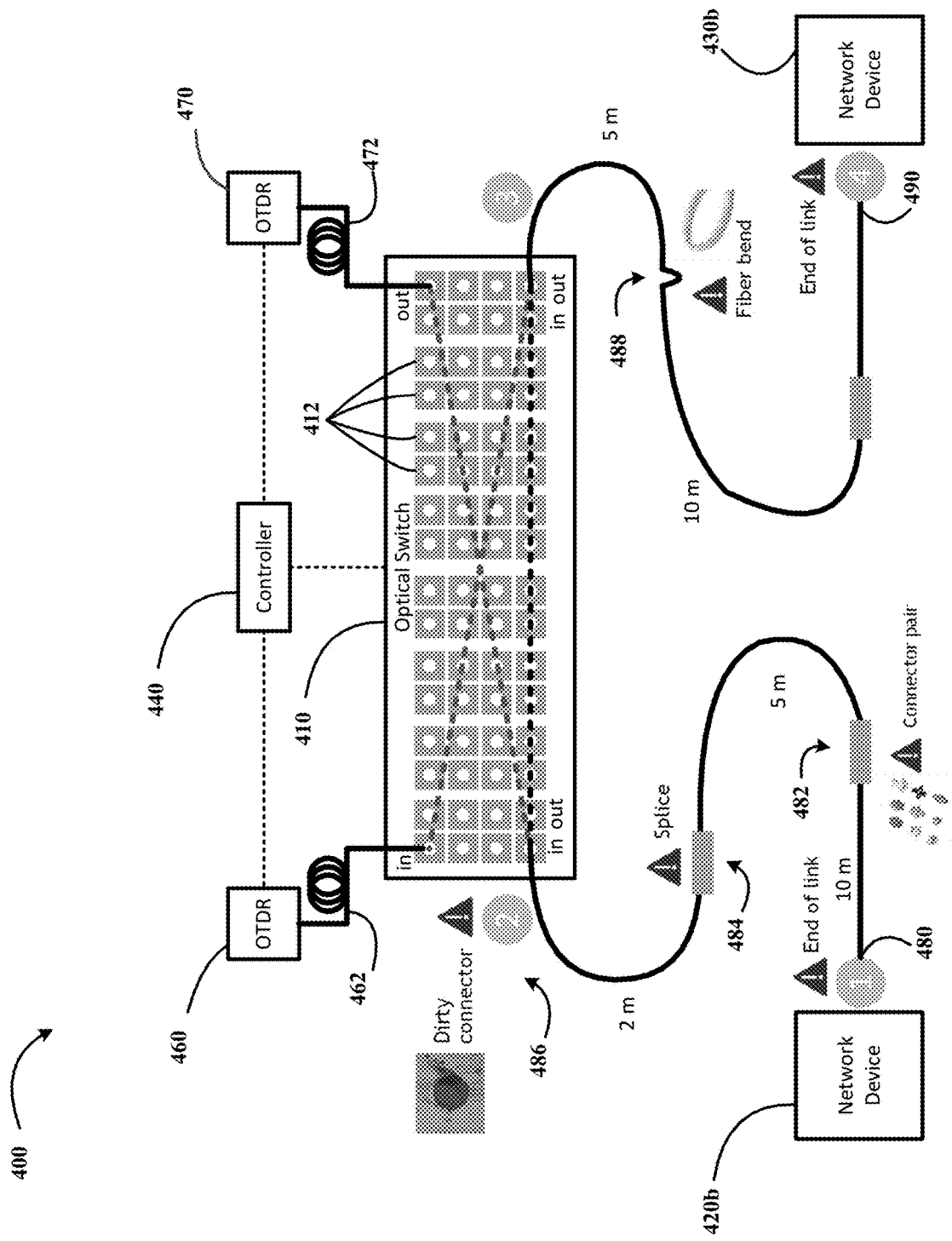
Figure 5:
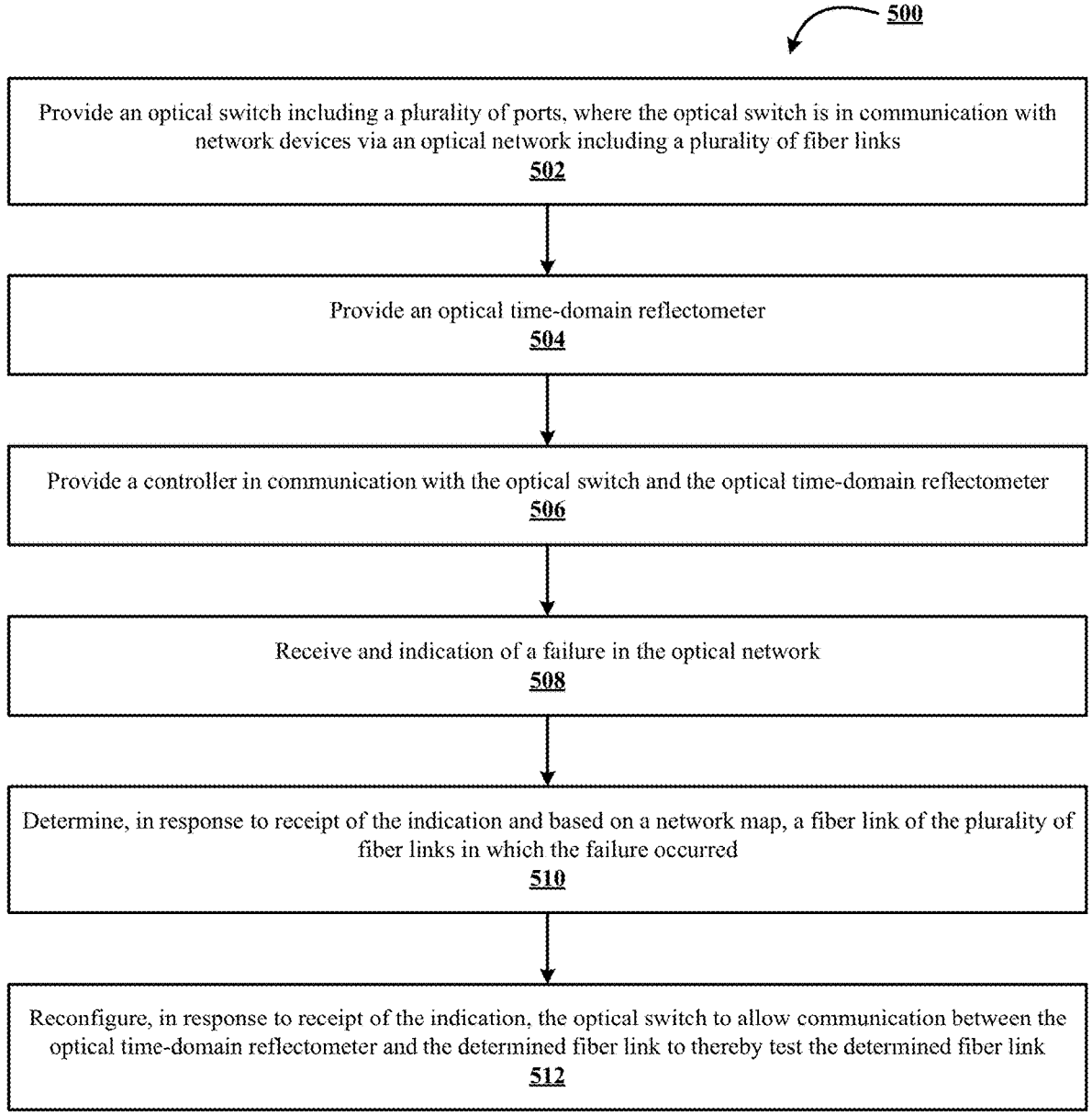

Having thus described embodiments of the invention in general terms, reference will now be made the accompanying drawings, wherein:

FIG. 1 illustrates a system environment for network discovery, port identification, and/or identifying fiber link failures in an optical network, in accordance with an embodiment of the invention;

FIG. 2 illustrates a system environment for network discovery and/or port identification in an optical network, in accordance with an embodiment of the invention;

FIG. 3 illustrates a process flow for network discovery and/or port identification in an optical network, in accordance with an embodiment of the invention;

FIG. 4 illustrates a system environment for identifying fiber link failures in an optical network, in accordance with an embodiment of the invention; and FIG. 5 illustrates a process flow for identifying fiber link failures in an optical network, in accordance with an embodiment of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Furthermore, when it is said herein that something is "based on" something else, it may be based on one or more other things as well. In other words, unless expressly indicated otherwise, as used herein "based on" means "based at least in part on" or "based at least partially on." Also, as used herein, the term "or" is intended to be inclusive when used in a series and may be used interchangeably with "and/or," unless explicitly stated otherwise (e.g., if used in combination with "either" or "only one of"). Like numbers refer to like elements throughout. No element, act, or instruction used herein should be construed as critical or essential unless explicitly described as such.

As noted, an optical network, such as an optical datacenter network, may include a plurality of fiber links connecting a plurality of network devices, such as switches, servers, systems, computing devices, and/or the like, for providing computational, storage, and/or network resources. The network devices typically include transceivers for sending and/or receiving the optical signals through the fiber links and/or, in the case of switches, components for receiving and routing the optical signals through the fiber links between the network devices. Optical switches typically include one or more input ports for receiving optical signals transmitted through one or more fiber links and one or more output ports through which the optical signals are routed into other fiber links. Depending on its architecture, an optical network may include multiple optical switches, such as tens, hundreds, or even thousands of optical switches.

To set up an optical network, add components to an optical network, and/or upgrade an optical network, a technician may be provided with information from a network architect and/or network control and management software that maps network devices to ports of the optical switches (e.g., a network map, a port map, and/or the like). The technician must, based on the mapping, correctly make the connections between the network devices and the ports using fiber links, which may include one or more splices, one or more connectors, and/or the like, in order for the optical network to function properly. However, such a human-driven process is error prone, tedious, and time-consuming. As the number of optical switches, switch ports, network devices, and connections increases, the manual effort and time required to correctly make the connections between the network devices and the ports using fiber links increases, as does the likelihood that errors will be made. Furthermore, when errors are made during such a human-driven connection process, detecting, identifying, and correcting the errors consumes additional resources, such as time, effort, financial resources, computing resources (e.g., processing resources, memory resources, power resources, communication resources, and/or the like) and/or network resources.

Some embodiments described herein provide a system, a computer program product, and/or a method for network discovery and/or port identification in an optical network. For example, a system may include an optical switch in communication with network devices via a network, a controller in communication with the optical switch, and a server (e.g., a local server) including a network port in communication with the optical switch. When installing, adding devices to, and/or upgrading an optical network, the controller may configure the optical switch to sequentially connect each of its ports to the network port of the server. The server may discover the optical network and map the network devices that are attached to the optical switch to the ports of the optical switch (e.g., based on port numbers, information identifying the network devices, and/or the like) to generate a network map and/or a port map. The server may then provide the network map and/or the port map to network control and management software (e.g., running on a network management system) to facilitate automatic addition of any newly connected network devices to the network. By using the server to discover the network devices connected to the ports of the optical switch and provide the network map and/or the port map to the network control and management software, the port mapping becomes dynamic, and a technician's precise implementation of fiber link connections between network devices based on mapping information is no longer necessary. Accordingly, the technician is not required to perform the error prone, tedious, and time-consuming human-driven process of connecting network devices based on information mapping network devices to ports of the optical switches (e.g., a network map, a port map, and/or the like). By eliminating such a human-driven process, the system conserves the time, effort, financial resources, computing resources (e.g., processing resources, memory resources, power resources, communication resources, and/or the like) and/or network resources otherwise consumed by detecting, identifying, and correcting connection errors during installation and/or upgrades.

Even after a successful installation and/or upgrade of an optical network, failures may occur within the optical network. An optical network may have a complex architecture and/or topology including optical switches, network devices, and fiber links connecting the network devices. When a failure occurs within one or more of the optical paths in the optical network, identifying the cause and/or location of the failure may consume significant time, effort, financial resources, computing resources (e.g., processing resources, memory resources, power resources, communication resources, and/or the like) and/or network resources. For example, failures such as fiber bends, dust in fiber connections, defective adapter pairs, and/or the like may cause lengthy troubleshooting periods during which system applications running on the optical network will be severely disrupted.

Some embodiments described herein provide a system, a computer program product, and/or a method for identifying fiber link failures in an optical network, in accordance with an embodiment of the invention. For example, a system may include an optical switch in communication with network devices via a network, an optical time-domain reflectometer (OTDR), and a controller in communication with the optical switch and the optical time-domain reflectometer. When a failure occurs in the network, the network control and management software (e.g., running on a network management system), one or more of the network devices, and/or another system connected to the network may detect the failure and generate an indication of the failure. The network control and management software may determine, based on a network map, a portion of the network in which the failure occurred and provide the indication of the failure to one or more controllers and/or optical switches in the affected portion of the network. For a given controller and/or optical switch that receives the indication, the controller may determine, based on the network map, a fiber link in which the failure occurred and reconfigure the optical switch to allow communication between the OTDR and the determined fiber link to thereby test the determined fiber link. In this way, a single OTDR may be shared within tens to hundreds of transceivers connected to the optical switch.

For example, the controller may be configured to test the determined fiber link using the OTDR, generate a report based on testing the fiber link, and provide the report to the network control and management software (e.g., running on a network management system). In some embodiments, the controller may be configured to use one or more OTDRs to perform a set of measurements on paths of the fiber link in which the failure occurred and send the results of the measurements in a report to the controller. The report may include a type of failure and a distance of the failure from the optical switch and/or the OTDR such that a technician may locate and repair the failure. By automatically connecting the OTDR and using the OTDR to test the fiber link in which the failure occurred, the system conserves the resources that would otherwise be consumed by manually attempting to identify the cause and/or location of the failure. Furthermore, generating and providing the report from the results of the measurements with the OTDR reduces the duration of troubleshooting periods, thereby minimizing disruption of system applications running on the optical network.

FIG. 1 illustrates a system environment 100 for network discovery, port identification, and/or identifying fiber link failures in an optical network, in accordance with an embodiment of the invention. As shown in FIG. 1, the system environment 100 may include an optical switch 110, a first plurality of network devices 120 (e.g., servers, switches, and/or the like), a second plurality of network devices 130 (e.g., servers, switches, and/or the like), a controller 140, a server 150, a first OTDR 160, and a second OTDR 170. In some embodiments, and as shown in FIG. 1, the connectivity topology of the system environment 100 may include many optical paths interconnecting different types of network devices. Additionally, or alternatively, the connectivity topology shown in FIG. 1 may be scaled up to create an extensive fiber connection tree in an optical network.

As shown in FIG. 1, each of the first plurality of network devices 120 may be connected to a first side (e.g., an input side) of the optical switch 110, and each of the second plurality of network devices 130 may be connected to a second side (e.g., an output side) of the optical switch 110. In some embodiments, and as shown in FIG. 1, the controller 140 may also be connected to the optical switch 110. For example, the controller 140 may be a local controller, a computer, a microcontroller, a server, a field-programmable gate array (FPGA), and/or the like. The controller 140 may be configured to perform one or more process flows (e.g., using the optical switch, the OTDRs, and/or the like) and may receive commands from network control and management software (e.g., running on a network management system).

As shown in FIG. 1, the server 150 may be connected to both sides of the optical switch 110. For example, the server 150 may include a network port and connect to the optical switch 110 via the network port. The server 150 may also include one or more processing devices and one or more non-transitory storage devices. In some embodiments, the server 150 may only be connected to the optical switch 110 during an installation and/or upgrade of the optical network to generate and/or regenerate a network map and/or a port map based on information associated with the first plurality of network devices 120 and the second plurality of network devices 130. After the installation and/or upgrade is completed, the server 150 may be disconnected from the optical switch 110.

As shown in FIG. 1, the first OTDR 160 and the second OTDR 170 may be connected to opposite sides of the optical switch 110. As noted, after a failure in the network, the optical switch 110 may be configured to connect each of the first OTDR 160 and the second OTDR 170 to different portions of a fiber link in which the failure occurred, such that the first OTDR 160 and the second OTDR 170 may perform a set of measurements on the different portions of the fiber link to determine a location and type of the failure. In some embodiments, a single OTDR and an optical selector switch (e.g., a 1×2 optical selector switch) that is capable of connecting to an input port and an output port of the optical switch may be included (e.g., to reduce cost as compared to using two OTDRs for each optical switch in the optical network). In this regard, the embodiment of the system environment 100 illustrated in FIG. 1 is exemplary and other embodiments may vary.

FIG. 2 illustrates a system environment 200 for network discovery and/or port identification in an optical network, in accordance with an embodiment of the invention. As shown in FIG. 2, the system environment 200 may include an optical switch 210, a server 220a, a switch 230a, a controller 240, and a server 250. In some embodiments, and as shown in FIG. 2, the optical switch 210 may include an array of ports 212 including input ports (e.g., "in" as shown in FIG. 2) and output ports (e.g., "out" as shown in FIG. 2). The embodiment of the system environment 200 illustrated in FIG. 2 is exemplary and other embodiments may vary.

In some embodiments, the system environment 200 may be a portion of the system environment 100 as shown and described herein with respect to FIG. 1. For example, the optical switch 210, the controller 240, and the server 250 may be similar to the optical switch 110, the controller 140, and the server 150, respectively, of FIG. 1, and vice versa. Furthermore, the server 220a may be one of the first plurality of network devices 120 of FIG. 1, and the switch 230a may be one of the second plurality of network devices 130 of FIG. 1.

As previously noted, the connectivity topology shown in FIG. 1 may be scaled up to create an extensive fiber connection tree in an optical network. To implement such a complex network topology and to facilitate an efficient and successful connection of additional optical switches and/or additional servers to the optical network, the server 250 may serve as an automated explorer and identifier of new devices. For example, when the server 220a and/or the switch 230a is newly connected to the optical network via the optical switch 210, or during a network initialization stage, the controller 240 may configure the optical switch 210 in such a way as to establish an optical connection between the server 220a and/or the switch 230a on the one hand and the server 250 on the other, as shown in the dashed circles in FIG. 2. In this way, the server 220a and/or the switch 230a may exchange identification messages and/or identification information (e.g., a MAC address, an IP address, device type, and/or the like) with the server 250, and the server 250 may discover the network devices attached to the optical switch 210. Additionally, or alternatively, the server 250 may share the identification messages and/or identification information with network control and management software (e.g., running on a network management system) to facilitate automatic addition of new devices to the optical network.

In some embodiments, after an upgrade is performed on the optical network (e.g., network devices and/or fiber links are added, removed, replaced, and/or the like), the server 250 may be reconnected to the optical switch 210 and the controller 240 may configure the optical switch 210 to sequentially connect each port of the plurality of ports of the optical switch 210 to the network port of the server 250. The server 250 may then exchange identification messages and/or identification information and regenerate the network map to reflect the upgrade to the optical network. In some embodiments, a technician may reconnect the server 250 after the upgrade to initiate the regeneration of the network map. Additionally, or alternatively, the network control and management software may instruct the controller 240 to reconnect the server 250.

FIG. 3 illustrates a process flow 300 for network discovery and/or port identification in an optical network, in accordance with an embodiment of the invention. In some embodiments, one or more controllers, one or more servers, network control and management software, one or more network management systems, and/or the like (e.g., similar to one or more of the systems described herein with respect to FIGS. 1, 2, and 4) may perform one or more of the steps of process flow 300.

As shown in block 302, the process flow 300 may include providing an optical switch including a plurality of ports, where the optical switch is in communication with network devices via an optical network. For example, the optical switch may be similar to the optical switch 110, the optical switch 210, and/or the optical switch 410 as shown and described herein with respect to FIGS. 1, 2, and 4, respectively. As another example, the network devices may be similar to the first plurality of network devices 120, the second plurality of network devices 130, the server 220a, the switch 230a, the network device 420b, and/or the network device 430b as shown and described herein with respect to FIGS. 1, 2, and 4.

As shown in block 304, the process flow 300 may include providing a server including a network port. For example, the server may be similar to the server 150 and/or the server 250 as shown and described herein with respect to FIGS. 1 and 2.

As shown in block 306, the process flow 300 may include providing a controller in communication with the optical switch. For example, the controller may be similar to the controller 140, the controller 240, and/or the controller 440 as shown and described herein with respect to FIGS. 1, 2, and 4, respectively.

As shown in block 308, the process flow 300 may include sequentially connecting each port, of the plurality of ports of the optical switch, to the network port of the server. For example, the process flow 300 may include configuring, with the controller, the optical switch to sequentially connect each of its ports to the network port of the server. In other words, the controller may configure the optical switch to connect a first port of the optical switch to the network port of the server, to disconnect the first port from the network port, then to connect a second port of the optical switch to the network port, to disconnect the second port from the network port, then to connect a third port of the optical switch to the network port, and so on, until each port of the optical switch has, in turn, been connected to the network port. As discussed with respect to block 310, when the network port of the server is connected to a given port of the optical switch, the server may receive and/or exchange information with a given network device connected to the given port. By sequentially connecting each port of the optical switch to the network port, the server may determine which network device is connected to each port of the optical switch.

As shown in block 310, the process flow 300 may include receiving information associated with and/or identifying each of the network devices. For example, the process flow 300 may include receiving, with the server, identification messages and/or identification information (e.g., a MAC address, an IP address, device type, and/or the like) from each of the network devices.

As shown in block 312, the process flow 300 may include generating, based on the information, a network map. For example, the process flow 300 may include generating, with the server, a network map and/or a port map based on port numbers, information identifying the network devices, and/or the like. In some embodiments, the network map and/or the port map may be generated by associating each port and/or each port number with a network device that is connected to the port in a data structure, such as a table, a database, and/or the like. Additionally, or alternatively, the network map and/or the port map may be generated by associating each network device connected to the optical switch with a port and/or a port number to which it is connected in a data structure, such as a table, a database, and/or the like Process flow 300 may include additional embodiments, such as any single embodiment or any combination of embodiments described below and/or in connection with one or more other processes described elsewhere herein. Although FIG. 3 shows example blocks of process flow 300, in some embodiments, process flow 300 may include additional blocks, fewer blocks, different blocks, or differently arranged blocks than those depicted in FIG. 3. Additionally, or alternatively, two or more of the blocks of process flow 300 may be performed in parallel.

FIG. 4 illustrates a system environment 400 for identifying fiber link failures in an optical network, in accordance with an embodiment of the invention. As shown in FIG. 4, the system environment 400 may include an optical switch 410, a network device 420b, a network device 430b, a controller 440, an OTDR 460, and an OTDR 470. In some embodiments, and as shown in FIG. 4, the optical switch 410 may include an array of ports 412 including input ports (e.g., "in" as shown in FIG. 4) and output ports (e.g., "out" as shown in FIG. 4). As also shown in FIG. 4, the OTDR 460 may be connected to an input port of the optical switch 410 via a fiber link 462, and the OTDR 470 may be connected to an output port of the optical switch 410 via a fiber link 472. The embodiment of the system environment 400 illustrated in FIG. 4 is exemplary and other embodiments may vary.

In some embodiments, the system environment 400 may be a portion of the system environment 100 as shown and described herein with respect to FIG. 1. For example, the optical switch 410, the controller 440, the OTDR 460, and the OTDR 470 may be similar to the optical switch 110, the controller 140, the first OTDR 160, and the second OTDR 170, respectively, of FIG. 1, and vice versa. Furthermore, the network device 420b may be one of the first plurality of network devices 120 of FIG. 1, and the network device 430b may be one of the second plurality of network devices 130 of FIG. 1.

FIG. 4 illustrates a variety of failure events including a failure at a first end of a link 480, a failure at a connector pair 482, a failure at a splice 484, a dirty connector 486, a fiber bend 488, and a failure at a second end of the link 490. Although FIG. 4 illustrates a variety of types of failures, these are provided only as examples for the purposes of explaining aspects of the invention, and other types of failures may be identified using one or more of the systems and/or processes described herein.

Again, the connectivity topology shown in FIG. 1 may be scaled up to create an extensive fiber connection tree in an optical network. However, when failure events, such as a fiber bend, dust in one or more fiber connectors, defective adapter pairs, and/or the like, occur in optical paths, such a complex topology may make identifying a cause and/or location of the failure events difficult. Furthermore, such failure events may cause long troubleshooting periods during which system applications may be severely disrupted.

To troubleshoot such failure events more efficiently, one or more OTDRs, such as the pair of OTDR 460 and OTDR 470, may be installed with the optical switch 410. Each of the OTDR 460 and the OTDR 470 may be a device capable of performing measurements along an optical link (e.g., a fiber link including one or more fiber link elements) and detecting failure events, warning events, and/or the like associated with the optical link. For example, the OTDR 460 and/or the OTDR 470 may include a laser light source and an optical detector (e.g., a photodiode) and may inject optical pulses (e.g., produced by the laser light source and electronics) into a fiber link. The OTDR 460 and/or the OTDR 470 may observe small proportions of light that are reflected backwards as an optical pulse travels along the fiber link under test.

In some embodiments, when network control and management software detects an error in the connection between points 1 and 4, as shown in FIG. 4, the controller 440 may configure the optical switch 410 such that the optical path between points 1 and 2 is connected to the OTDR 460 and the optical path between points 3 and 4 is connected to the OTDR 470. Additionally, or alternatively, the OTDR 460 and the OTDR 470 may perform a set of measurements on the respective optical paths and provide result reports to the controller 440. In some embodiments, the reports may include details associated with the fiber links under test and/or warning events as well as precise locations of the warning event (e.g., a fiber distance from the OTDR).

For example, and as shown in FIG. 4, a report on the optical path between points 1 and 2 may indicate that the optical path includes the splice 484 two meters from the optical switch 410, the connector pair 482 five meters from the splice 484, the end of the link ten meters from the connector pair, and one or more failure and/or warning events detected, such as the dirty connector 486, a failure and/or problem at the splice 484, a failure and/or problem at the connector pair 482, a failure and/or problem at the end of link 480, and/or the like. As another example, and as shown in FIG. 4, a report on the optical path between points 3 and 4 may indicate that the optical path includes the fiber bend 488 five meters from the optical switch 410, another connector ten meters from the fiber bend 488, the end of the link 490, and one or more failure and/or warning events detected, such as the fiber bend 488, a failure and/or problem at the end of link 490, and/or the like.

Based on the reports, a technician may more quickly and/or more easily locate and fix problematic fiber link components of the fiber link and/or optical path. In some embodiments, installing a pair of OTDRs with the optical switch 410 enhances the resilience and/or serviceability of the system environment 400 and reduces the troubleshooting period associated with failure and/or warning events. As noted, in some embodiments, a single OTDR and an optical selector switch (e.g., a 1×2 optical selector switch) that connects to an input port and an output port of the optical switch 410 may be included (e.g., to reduce cost as compared to using two OTDRs for each optical switch in the optical network).

FIG. 5 illustrates a process flow 500 for identifying fiber link failures in an optical network, in accordance with an embodiment of the invention. In some embodiments, one or more controllers, one or more servers, network control and management software, one or more network management systems, and/or the like (e.g., similar to one or more of the systems described herein with respect to FIGS. 1, 2, and 4) may perform one or more of the steps of process flow 500.

As shown in block 502, the process flow 500 may include providing an optical switch including a plurality of ports, where the optical switch is in communication with network devices via an optical network (e.g., an optical datacenter network) including a plurality of fiber links. For example, the optical switch may be similar to the optical switch 110, the optical switch 210, and/or the optical switch 410 as shown and described herein with respect to FIGS. 1, 2, and 4, respectively. As another example, the network devices may be similar to the first plurality of network devices 120, the second plurality of network devices 130, the server 220*a*, the switch 230*a*, the network device 420*b*, and/or the network device 430*b* as shown and described herein with respect to FIGS. 1, 2, and 4.

As shown in block 502, the process flow 500 may include providing an optical time-domain reflectometer. For example, the optical time-domain reflectometer may be similar to the first OTDR 160, the second OTDR 170, the OTDR 460, and/or the OTDR 470 as shown and described herein with respect to FIGS. 1 and 4.

As shown in block 506, the process flow 500 may include providing a controller in communication with the optical switch and the optical time-domain reflectometer. For example, the controller may be similar to the controller 140, the controller 240, and/or the controller 440 as shown and described herein with respect to FIGS. 1, 2, and 4, respectively.

As shown in block 508, the process flow 500 may include receiving an indication of a failure in the optical network. For example, the process flow 500 may include receiving, with the controller, an indication of a failure in the optical network from network control and management software, a network management system, another controller, a server, and/or the like.

As shown in block 510, the process flow 500 may include determining, in response to receipt of the indication and based on a network map, a fiber link of the plurality of fiber links in which the failure occurred. For example, the process flow 500 may include determining, with the controller, a fiber link of the plurality of fiber links in which the failure occurred based on a network map (e.g., generated by a server, received from network control and management software, received from a network management system, and/or the like).

As shown in block 510, the process flow 500 may include reconfiguring, in response to receipt of the indication, the optical switch to allow communication between the optical time-domain reflectometer and the determined fiber link to thereby test the determined fiber link. For example, the process flow 500 may include reconfiguring, with the controller, the optical switch to allow communication between the optical time-domain reflectometer and the determined fiber link to test the determined fiber link with the optical time-domain reflectometer.

In some embodiments, the process flow 500 may include testing, using the optical time-domain reflectometer, the determined fiber link; generating, based on testing the determined fiber link, a report; and providing, to a network management system, the report. Additionally, or alternatively, the report may include a type of the failure in the determined fiber link and a distance of the failure from the optical switch. In some embodiments, the type of failure in the determined fiber link may include a fiber failure, a contaminated connector, a connector pair failure, an end of link failure, a fiber bend, and/or the like.

In some embodiments, the determined fiber link may include a plurality of fiber link elements, and the process flow 500 may include sequentially reconfiguring the optical switch to allow communication between the optical time-domain reflectometer and a respective fiber link element of the determined fiber link. In this regard, sequentially reconfiguring the optical switch may include reconfiguring the optical switch to allow communication between the optical time-domain reflectometer and each fiber link element of the plurality of fiber link elements, in turn, of the determined fiber link. The process flow 500 may further include testing, using the optical time-domain reflectometer, the respective fiber link element of the determined fiber link. Additionally, or alternatively, the plurality of fiber link elements may include one or more fibers, one or more connectors, and/or the like.

In some embodiments, the process flow 500 may include providing another optical switch paired with the optical time-domain reflectometer and configuring the other optical switch to allow communication between the optical time-domain reflectometer and an input port of the determined fiber link as well as an output port of the determined fiber link. Additionally, or alternatively, the process flow 500 may include providing another optical time-domain reflectometer and, when reconfiguring the optical switch to allow communication between the optical time-domain reflectometer and the determined fiber link, configuring the optical switch to (i) allow communication between the first optical time-domain reflectometer and an input port of the determined fiber link and (ii) allow communication between the second optical time-domain reflectometer and an output port of the determined fiber link and testing the determined fiber link using both of the optical time-domain reflectometers.

In some embodiments, the process flow 500 may include providing the report and/or information from the report to the network control and management software, the network management system, and/or the like. Additionally, or alternatively, the process flow 500 may include reconfiguring the optical switch to replace the determined fiber link with another fiber link (e.g., a redundant fiber link, a replacement fiber link, and/or the like). For example, the network control and management software, the network management system, and/or the like may provide instructions and/or commands to the controller and/or the optical switch to reconfigure the optical switch to replace the determined fiber link with another fiber link.

The process flow 500 may include additional embodiments, such as any single embodiment or any combination of embodiments described above and/or in connection with one or more other processes described elsewhere herein. Although FIG. 5 shows example blocks of process flow 500, in some embodiments, process flow 500 may include additional blocks, fewer blocks, different blocks, or differently arranged blocks than those depicted in FIG. 5. Additionally, or alternatively, two or more of the blocks of process flow 500 may be performed in parallel.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor and/or a processing device, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium and/or a non-transitory storage device, such as a tangible electronic, magnetic, optical, electromagnetic, infrared, and/or semiconductor system, device, and/or other apparatus. For example, in some embodiments, the non-transitory computer-readable medium and/or the non-transitory storage device includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g., a memory) that may direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments may be configured without departing from the scope and spirit of the invention. Therefore, it is to be understood that, within the scope of the appended claims, the invention may be practiced other than as specifically described herein.

What is claimed is:

1. A system for identifying one or more fiber link failures in an optical network, the system comprising:
    an optical switch in communication with one or more network devices via an optical network, wherein the optical network comprises a plurality of fiber links;
    a first optical time-domain reflectometer;
    a second optical time-domain reflectometer; and
    a controller in communication with the optical switch, the first optical time-domain reflectometer, and the second optical time-domain reflectometer, wherein the controller is configured to:
        receive an indication of a failure in the optical network;
        determine, in response to receipt of the indication and based on a network map, a fiber link of the plurality of fiber links in which the failure occurred; and
        reconfigure, in response to the receipt of the indication, the optical switch to (i) allow communication between the first optical time-domain reflectometer and an input port of the determined fiber link and (ii) allow communication between the second optical time-domain reflectometer and an output port of the determined fiber link; and
        test the determined fiber link using the first optical time-domain reflectometer and the second optical time-domain reflectometer.

2. The system of claim 1, wherein the controller is configured to:
    generate, based on testing the determined fiber link, a report; and
    provide, to a network management system, the report.

3. The system of claim 2, wherein the report comprises a type of the failure in the determined fiber link and a distance of the failure from the optical switch.

4. The system of claim 3, wherein the type of the failure in the determined fiber link comprises at least one of: a fiber failure, a contaminated connector, a connector pair failure, an end of link failure, or a fiber bend.

5. The system of claim 1, wherein the determined fiber link comprises a plurality of fiber link elements, and wherein reconfiguring the optical switch to (i) allow communication between the first optical time-domain reflectometer and the input port of the determined fiber link and (ii) allow communication between the second optical time-domain reflectometer and the output port of the determined fiber link and testing the determined fiber link using the first optical time-domain reflectometer and the second optical time-domain reflectometer comprises sequentially for each fiber link element of the plurality of fiber link elements of the determined fiber link:
    reconfiguring the optical switch to (i) allow communication between the first optical time-domain reflectometer and an input port of a respective fiber link element of the determined fiber link and (ii) allow communication between the second optical time-domain reflectometer and an output port of the respective fiber link element of the determined fiber link; and
    testing, using the first optical time-domain reflectometer and the second optical time-domain reflectometer, the respective fiber link element of the determined fiber link.

6. The system of claim 5, wherein the plurality of fiber link elements comprises one or more fibers and one or more connectors.

7. A method for identifying one or more fiber link failures in an optical network, the method comprising:
    receiving, via a controller, an indication of a failure in an optical network, wherein the optical network comprises a plurality of fiber links, and wherein the controller is in communication with an optical switch, a first optical time-domain reflectometer, and a second optical time-domain reflectometer;
    determining, in response to receipt of the indication and based on a network map, a fiber link of the plurality of fiber links in which the failure occurred; and
    reconfiguring, in response to receipt of the indication and via the controller, the optical switch to (i) allow communication between the first optical time-domain reflectometer and an input port of the determined fiber link and (ii) allow communication between the second optical time-domain reflectometer and an output port of the determined fiber link to thereby test the determined fiber link.

8. The method of claim 7, comprising:
testing, with the first optical time-domain reflectometer and the second optical time-domain reflectometer, the determined fiber link;
generating, based on testing the determined fiber link, a report; and
providing the report to a network management system.

9. The method of claim 7, wherein the determined fiber link comprises a plurality of fiber link elements, and wherein reconfiguring the optical switch to (i) allow communication between the first optical time-domain reflectometer and the input port of the determined fiber link and (ii) allow communication between the second optical time-domain reflectometer and the output port of the determined fiber link comprises, sequentially and for each element of the determined fiber link:
reconfiguring the optical switch to (i) allow communication between the first optical time-domain reflectometer and an input port of a respective fiber link element of the determined fiber link and (ii) allow communication between the second optical time-domain reflectometer and an output port of the respective fiber link element of the determined fiber link; and
testing, with the first optical time-domain reflectometer and the second optical time-domain reflectometer, the respective fiber link element of the determined fiber link.

10. The method of claim 9, wherein the plurality of fiber link elements comprises one or more fibers and one or more connectors.

11. The method of claim 7, comprising determining, with the first optical time-domain reflectometer or the second optical time-domain reflectometer, a type of the failure in the determined fiber link and a distance of the failure from the optical switch.

12. The method of claim 7, comprising generating, via a server, the network map for the optical network, wherein the server comprises a network port in communication with the optical switch.

13. The method of claim 12, wherein:
the optical switch comprises a plurality of ports; and
generating the network map for the optical network comprises sequentially connecting each port of the plurality of ports to the network port of the server and generating the network map based on information associated with one or more network devices connected to the plurality of the ports.

14. The method of claim 12, wherein generating the network map for the optical network comprises receiving, from a network management system, information identifying each network device connected to the optical switch and generating, via the server, the network map and a port map based on the information.

15. The method of claim 12, comprising regenerating, after an upgrade is performed on the optical network, the network map for the optical network.

16. A computer program product for identifying one or more fiber link failures in an optical network, the computer program product comprising a non-transitory computer-readable medium comprising code that, when executed by a first apparatus, causes the first apparatus to:

receive an indication of a failure in an optical network, wherein the optical network comprises a plurality of fiber links and a first optical switch in communication with one or more network devices and a second optical switch paired with an optical time-domain reflectometer;
determine, in response to receiving the indication and based on a network map, a fiber link of the plurality of fiber links in which the failure occurred;
configure the second optical switch to allow communication between the optical time domain reflectometer and (1) an input port of the determined fiber link and (2) an output port of the determined fiber link; and
reconfigure, in response to receiving the indication, the first optical switch to allow communication between the optical time-domain reflectometer and the determined fiber link.

17. The computer program product of claim 16, wherein the non-transitory computer-readable medium comprises code that, when executed by the first apparatus, causes the first apparatus to test, with the optical time-domain reflectometer, the determine fiber link.

18. The computer program product of claim 17, wherein the non-transitory computer-readable medium comprises code that, when executed by the first apparatus, causes the first apparatus to:
generate, based on testing the determined fiber link, a report; and
provide the report to a network management system.

19. The computer program product of claim 16, wherein the non-transitory computer-readable medium comprises code that, when executed by the first apparatus, causes the first apparatus to determine, with the optical time-domain reflectometer, a type of the failure in the determined fiber link and a distance of the failure from the optical switch.

20. The computer program product of claim 16, wherein the non-transitory computer-readable medium comprises code that, when executed by the first apparatus, causes the first apparatus to generate, via a server, the network map for the optical network, wherein the server comprises a network port in communication with the optical switch.

21. The computer program product of claim 20, wherein the optical switch comprises a plurality of ports, and wherein the non-transitory computer-readable medium comprises code that, when executed by the first apparatus, causes the first apparatus to, when generating the network map for the optical network, sequentially connect each port of the plurality of ports to the network port of the server and generate the network map based on information associated with one or more network devices connected to the plurality of the ports.

22. The computer program product of claim 20, wherein the non-transitory computer-readable medium comprises code that, when executed by the first apparatus, causes the first apparatus to, when generating the network map for the optical network, receive, from a network management system, information identifying each network device connected to the optical switch and generate, via the server, the network map and a port map based on the information.

* * * * *

UNITED STATES PATENT AND TRADEMARK OFFICE
CERTIFICATE OF CORRECTION

PATENT NO. : 12,278,662 B2
APPLICATION NO. : 17/896877
DATED : April 15, 2025
INVENTOR(S) : Paraskevas Bakopoulos et al.

Page 1 of 1

It is certified that error appears in the above-identified patent and that said Letters Patent is hereby corrected as shown below:

On the Title Page

Under Item (72):
Please change the residence information for inventor Paraskevas Bakopoulos to Ilion (GR)

Under Item (30):
Please change the foreign priority application information to 20220100605

Signed and Sealed this
Thirteenth Day of May, 2025

Coke Morgan Stewart
*Acting Director of the United States Patent and Trademark Office*